(12) United States Patent
Coop et al.

(10) Patent No.: US 7,551,086 B2
(45) Date of Patent: Jun. 23, 2009

(54) SYSTEM AND METHODS FOR TRACKING AIRCRAFT COMPONENTS

(75) Inventors: William Phillip Coop, Kent, WA (US); Michael C. Muma, Auburn, WA (US); Rocke R. Koreis, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/530,664

(22) Filed: Sep. 11, 2006

(65) Prior Publication Data

US 2007/0114280 A1     May 24, 2007

Related U.S. Application Data

(60) Provisional application No. 60/718,682, filed on Sep. 20, 2005, provisional application No. 60/718,884, filed on Sep. 20, 2005, provisional application No. 60/718,871, filed on Sep. 20, 2005.

(51) Int. Cl.
*G08B 13/14* (2006.01)
(52) U.S. Cl. ............ 340/572.1; 340/505; 340/457.4; 701/30; 702/184
(58) Field of Classification Search ............ 340/572.1, 340/505, 514, 517, 539.1, 679, 457.4, 348; 701/30; 702/184; 235/375
See application file for complete search history.

(56) References Cited

U.S. PATENT DOCUMENTS

| | | | |
|---|---|---|---|
| 6,381,541 B1 | 4/2002 | Sadler | |
| 6,611,198 B1 | 8/2003 | Geiszler et al. | |
| 6,859,757 B2 | 2/2005 | Muehl et al. | |
| 6,965,816 B2 | 11/2005 | Walker | |
| 6,995,655 B2 | 2/2006 | Ertin et al. | |
| 7,047,159 B2 | 5/2006 | Muehl et al. | |
| 2004/0020994 A1 | 2/2004 | Muehl et al. | |

(Continued)

FOREIGN PATENT DOCUMENTS

EP    0486044 A    5/1992

(Continued)

OTHER PUBLICATIONS

Muhlenbruch H et al. "Data Acquisition During the Entire Product Life Cycle as a basis for the Maintenance, Dismantling and Product Recycling Process"; Proceedings of the International Mechanical Engineering Congress and Exposition; Nov. 19, 2004; pp. 1-7.

(Continued)

*Primary Examiner*—Toan N Pham
(74) *Attorney, Agent, or Firm*—Armstrong Teasdale LLP

(57) ABSTRACT

An aircraft component identification and maintenance tracking system is disclosed. The system includes a plurality of aircraft components, a plurality of radio frequency identification (RFID) tags, and a transceiver operatively configured to transmit an activation signal to each of the RFID tags. Each of the RFID tags is associated with a respective one of the aircraft components and comprises identification and maintenance data information specific to the aircraft component to which it is associated. The transceiver is configured to receive information transmitted by each of the RFID tags which are configured to transmit identification and maintenance data information that is representative of a maintenance history for the aircraft component to which the RFID tag is associated.

38 Claims, 11 Drawing Sheets

U.S. PATENT DOCUMENTS

| | | |
|---|---|---|
| 2005/0044180 A1 | 2/2005 | Lamers et al. |
| 2006/0086790 A1 | 4/2006 | Sloan et al. |
| 2006/0144997 A1 | 7/2006 | Schmidt et al. |
| 2007/0063847 A1* | 3/2007 | Lee et al. .................. 340/572.1 |
| 2007/0114280 A1* | 5/2007 | Coop et al. ................. 235/385 |
| 2007/0241908 A1* | 10/2007 | Coop ....................... 340/572.8 |

FOREIGN PATENT DOCUMENTS

| | | |
|---|---|---|
| EP | 0493786 A | 7/1992 |
| WO | 9724398 A | 7/1997 |
| WO | 2004013785 A | 2/2004 |

OTHER PUBLICATIONS

International Search Report No. PCT/US2007/086051; Jun. 3, 2008; 28 pages.

"RFID: The Future of MRO Supply Chain Management"; http://www.aviationtoday.com/am/categories/maintenance/476.html; Sep. 1, 2004; pp. 1-5.

European Search Report of Application No. 06 851 704.4-2221; Dec. 29, 2008; 4 pages.

* cited by examiner

SYSTEM AND METHODS FOR TRACKING AIRCRAFT COMPONENTS

CROSS REFERENCE TO RELATED APPLICATIONS

This application claims the priority of U.S. Provisional Patent Application Nos. 60/718,682 entitled "System and Method for Tracking Aircraft Components and Maintenance History", 60/718,884 entitled "Radio Frequency Identification and Tracking of Aircraft Parts", and 60/718,871 entitled "Methods and Apparatuses for Determining and Managing Aircraft Configurations Using Radio Frequency Identification Tags", all filed Sep. 20, 2005, all of which are hereby incorporated by reference in their entirety.

BACKGROUND OF THE INVENTION

This invention relates generally to Radio Frequency Identification systems, particularly to a system and method for identification and tracking of aircraft components.

Controlling and verifying configurations of aircraft, such as, for example, commercial aircraft and military aircraft, is very labor intensive. Typically, thousands of serial numbered parts have to be tracked by hand using paper forms, resulting in inevitable errors in determining and recording of the exact parts that are on an airplane. The task of tracking aircraft parts on a given aircraft becomes even more complicated as time goes on, for example, due to maintenance procedures such as "D" checks that are conducted periodically during the life of an aircraft, during which many parts may be replaced, and/or repaired. Because of the sheer volume of data that must be entered into the records maintained for each aircraft, errors are bound to occur during data entry of information in relation to the condition and/or history of one or more aircraft components.

As a result, tracking maintenance history on aircraft parts is currently a fairly complex operation. There is typically no on-site method for a mechanic to determine the maintenance history of a given part.

Radio Frequency Identification ("RFID") is an extremely powerful and cost effective technology that allows a wide range of objects to be identified, tracked and managed. RFID technology is based on the use of small radio tags or transponders and readers/encoders for connection to an information system. These RFID tags, which contain a unique code together with other additional information that may be specified by the user, can be read by the reader/encoder from a distance without contact or line-of-sight. Tagging and tracking of products and devices utilizing radio frequency identification is widely used in manufacturing and packaging processes, but has not yet been used to label individual component parts of large complex machines.

A basic RFID system consists of three components: an antenna or coil, a transceiver (with decoder), and a transponder (RF tag) electronically programmed with unique information. Often the antenna is packaged with the transceiver and decoder to become a reader or interrogator, which can be configured either as a handheld or a fixed-mount device. The reader emits radio or magnetic waves in ranges of anywhere from one inch to 100 feet or more, depending upon its power output and the radio frequency used. When a RFID tag is within the electromagnetic zone of a transceiver, it detects the reader's activation signal. The electromagnetic field activates the RFID tag (transponder) attached to and associated with an object. In response, the RFID tag transmits an identifier code to the reader to indicate the presence of the object to which it is attached. Because of the characteristics of electromagnetic energy, there does not have to be a direct line of sight between the reader and the RFID tag. The reader, which acts as a transceiver, decodes the data encoded in the tag's integrated circuit (typically a silicon chip) and the data is passed to a host computer for processing. The reader/encoder may also write data to the RFID tag.

RFID tags are available in a wide variety of shapes and sizes. Tags can be configured as small as possible. In some instances, the RFID tag may be as small as a pencil lead in diameter and one-half inch in length. In an aircraft, it would be desired to have the RFID tags as small as possible in order to keep the payload (e.g., weight) as low as possible, thereby allowing for maximum fuel efficiency.

RFID tags are categorized as either active or passive. Active RFID tags are powered by an internal battery and are typically read/write, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data would then become part of the tagged part's history. The battery-supplied power of an active tag generally gives it a longer read range. The trade off is greater size, greater cost, and an operational life limited to about 10 years depending on operating temperatures and battery type.

Passive RFID tags operate without an internal power source and obtain operating power from the transmissions generated by the reader. Consequently, passive tags are much lighter than active tags, less expensive, and offer a virtually unlimited operational lifetime. The trade off is that they have shorter read ranges than active tags and require a higher-powered reader. Read-only tags are typically passive and are programmed with a unique set of data (usually 32 to 128 bits) that cannot be modified. Read/write tags may also be passive. They are programmed with a unique set of data and such data may be modified and updated at desired intervals.

The significant advantage of all types of RFID systems is the non-contact, non-line-of-sight nature of the technology. Tags can be read through a variety of substances, including metal, where barcodes or other, traditional optically read technologies would be useless. RFID tags can also be read in challenging circumstances at remarkable speeds, in most cases responding in less than 100 milliseconds.

Conventional procedures for identification of in-service and on-board aircraft components during aircraft maintenance operations are through visual identification by way of reading labels and or part numbers affixed to the components. The problem with such conventional procedures is that reading labels and or part numbers is a time consuming and difficult process in adverse weather conditions, darkness, and crowded or cramped spaces. Maintenance technicians spend countless hours "visually" identifying aircraft components. As part of the identification process, they often use awkward tools such as flashlights and mirrors and in many instances remove access panels and other components, sometimes unnecessarily, to gain visual access to aircraft components for visual identification. This results in possible errors and long delays in flight schedules as well as inadvertent part removal, physical injury, and aircraft damage.

Personal injury, aircraft damage, lost parts, and extensive unnecessary hours of expended labor are all a result of the current method of visually identifying aircraft components. Airline operations count on efficient line and base maintenance practices, which in today's fiercely competitive maintenance environment, requires every possible advantage to become and/or remain successful. Darkness, where and during when most line maintenance occurs, greatly reduces a technician's ability to quickly locate a component. Extreme cold or hot temperatures affect a technician's physical ability. Rain, sleet, snow, wind and other environmental impacts affect a technician's physical ability. The pressures of fast turnaround and a high paced aircraft operational environment affect a technician physically and mentally. All of the aforementioned issues can impact the safety of the traveling public as well as the technician. Accordingly, there is a need for a system and method that allows for a more efficient identification of aircraft components in adverse weather conditions, darkness, and crowded or cramped spaces. There is also a need for a method of identifying aircraft component parts that are not in a maintenance technician's direct line of sight, whereby such components may be identified without removal of access panels and other components. There is further a need for a system that provides for the local storage of maintenance information, so that maintenance records are always with the components and the records are readily available to all technicians and mechanics in the field.

BRIEF DESCRIPTION OF THE INVENTION

In one aspect, an aircraft component identification and maintenance tracking system is provided. The system comprises a plurality of aircraft components, a plurality of radio frequency identification (RFID) tags, and a transceiver operatively configured to transmit an activation signal to each of the RFID tags. Each of the RFID tags is associated with a respective one of the aircraft components, and comprises identification and maintenance data information specific to the aircraft component to which it is associated. The transceiver is operatively configured to transmit an activation signal to each of the RFID tags, and further configured to receive information transmitted by each of the RFID tags. The RFID tags are configured to transmit identification and maintenance data information that is representative of a maintenance history for the aircraft component to which the RFID tag is associated.

In another aspect, a method for maintaining aircraft in which a plurality of aircraft components are integrated with radio frequency identification (RFID) tags is provided. The method comprises transmitting an activation signal for reception by one of the RFID tags, receiving information transmitted by the RFID tags, and determining, from the received information, identification and maintenance data associated with the aircraft component with which the RFID tag is integrated.

In still another aspect, a scanning system for ascertaining information about components of an aircraft is provided. The scanning system comprises one or more radio frequency identification tags, each of which is secured to an aircraft component, and a scanning device for scanning the radio frequency identification tags.

In yet another aspect, a component for an aircraft comprising an RFID tag affixed thereto is provided. The RFID tag comprises stored data relating to at least one of aircraft component identification, aircraft component maintenance history, aircraft component configuration, aircraft component installation date, and aircraft component inspection.

DETAILED DESCRIPTION OF THE INVENTION

Figure 1:
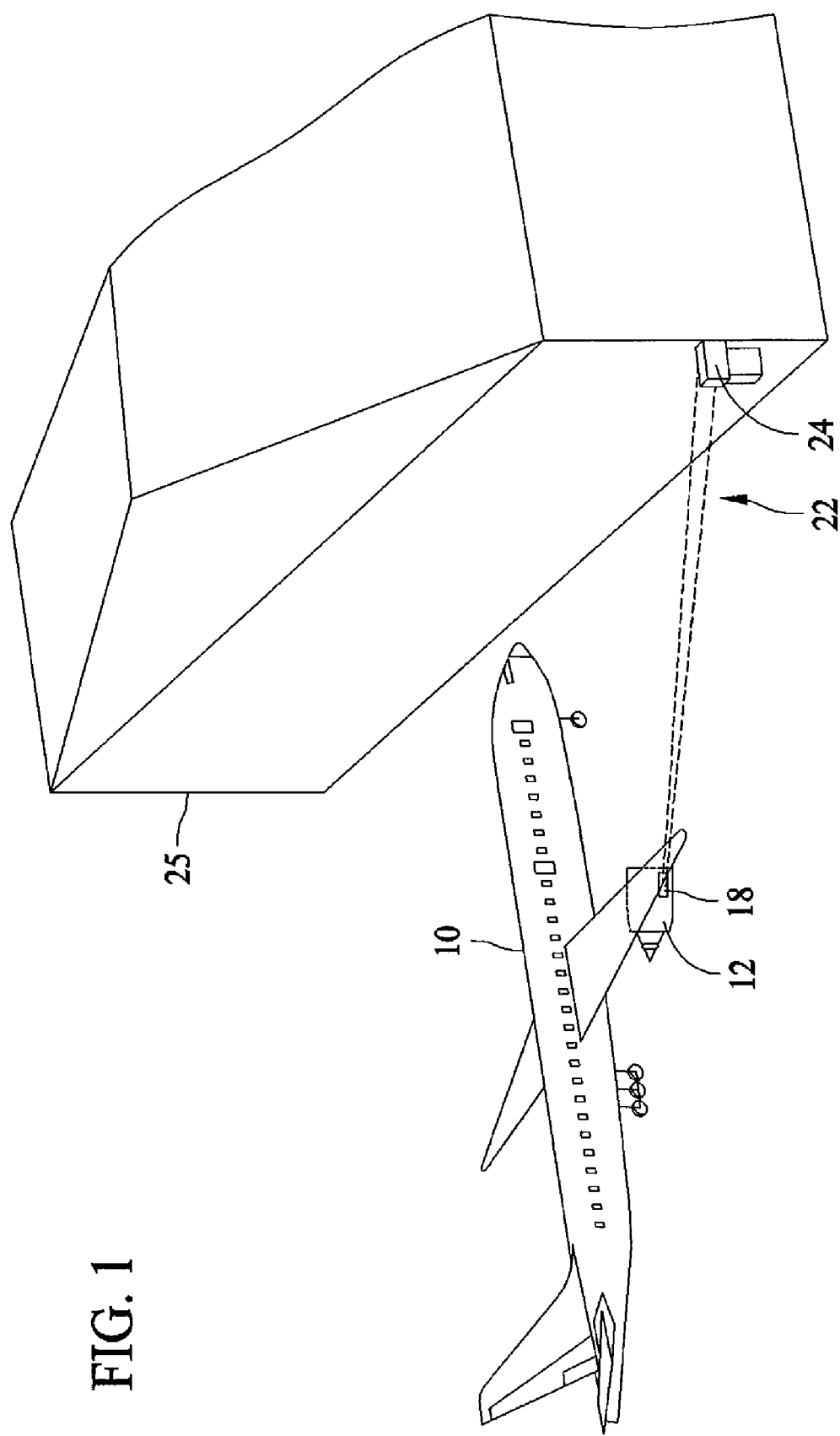
FIG. 1 is a diagrammatic perspective view of an aircraft that may be tagged and scanned using RFID tags and an RFID scanning device attached to a hangar door opening.

Herein described are methods and systems for identifying and facilitating a determination of the existence of, status of, and repair state of component parts of an aircraft utilizing Radio Frequency Identification ("RFID") technology.

As further described herein, a system for identifying and determining data relating to aircraft component parts is facilitated by the inclusion of a programmable RFID tag affixed to each relevant component, which includes an antenna with a coil and a transceiver. Each programmable RFID tag is encoded with component part specific information. The transceiver is configured to read and transmit the encoded information concerning the component part upon receiving signals from an external reading and programming device. RFID tags are also sometimes referred to as RFID transponders due to their inherent passive nature and capability to transmit or receive data only in response to query or update requests from RFID query/update devices. In specific embodiments, and as further described herein, the RFID tags include certain capabilities in addition to the standard RFID tag properties.

In one embodiment, the RFID tag includes software embedded therein which causes the RFID tags to recognize and respond only to authorized inquiry and update requests. In another embodiment, the RFID tag includes software embedded therein which causes the RFID tags to format and process information for storage and retrieval purposes. Additionally, the RFID tag may include a processing device and non-volatile storage sufficient to store the codes and information used to process the legitimate and authorized requests directed to it from an RFID query/update device.

With regard to authorized inquiry and update requests, the non-volatile storage in certain embodiments of the RFID tag includes software that enables the RFID tag to only respond to received messages that include, for example, a specific authorization code. In these embodiments of RIFD tags, the software may be further configured such that only received messages in a specific data format will be recognized by the RFID tags. In a particular embodiment, the data format includes one or more defined data fields within the message, one or more of which may be read-only fields.

Such messages may also include one or more command codes that specify what type of message (i.e., inquiry, data update, reconfiguration of RFID tag) is being received by the RFID tag. In a particular embodiment, the authorization codes are user selectable. Having user selectable authorization codes provides a mechanism such that multiple users (i.e., different airlines, military) cannot inadvertently receive data from, or accidentally reconfigure, RFID tags belonging to another entity. In these embodiments, the data format may be the same for all users.

An RFID query/update device, sometimes referred to as an exciter or an external reading and programming device, in one embodiment, and as further described herein, includes a capability to supply the necessary RF energy and information to query and or update RFID tags. Such a device also includes the ability to provide processing functions necessary to utilize the data transmitted to and received from the RFID tags. In addition to standard RFID exciter properties, embodiments of the RFID query/update device include, for example, embedded software to create authorized query and update requests, in the correct data formats, to satisfy authorization codes embedded within the various RFID tags as described above, and embedded software to format query and update requests that will be understood by the RFID tags. Such RFID query/update devices allow a user to program one or more authorization codes that will be utilized for the RFID tags associated with such a device (and user). As a result, such RFID tags and RFID query/update devices provide a capability to implement an authorization process in software whereby an individual RFID tag responds only to authorized query/update requests.

Such a system enables a method for reducing and possibly eliminating mistakes associated with aircraft maintenance, since the individual aircraft component parts have a programmable RFID tag affixed thereto that includes component identification data. The methods associated with such devices may include, scanning and thereby identifying a specific aircraft component part and its respective maintenance history, performing maintenance on the component part and encoding additional maintenance work data to the component maintenance history on the RFID tag detailing all maintenance performed.

In accordance with one aspect of the invention, and as alluded to above, one or more aircraft components, such as, for example, all major and flight critical parts on an aircraft (such as, for example, life-limited parts, and/or parts requiring periodic inspection, maintenance, and/or repair), may be tagged using radio frequency identification (RFID) tags. As shown in FIG. 1, an exemplary aircraft 10 may include thousands of components, such as, for example, engines 12 and 14 (visible in FIGS. 1 and 2, respectively), each of which may be labeled with an RFID tag 18, 20, respectively. Employed RFID tags, for example, tags similar to RFID tags 18 and 20 are attached to individual aircraft components electronically identifying the component and store specific variable information pertaining to the component to which it is attached. RFID tags suitable for this purpose are commercially available and typically cost on the order of 30 to 50 cents, or less, per tag. Such tags may be programmed with useful information for tracking and verifying aircraft configurations, such as, for example, a description of the component, a serial number associated with the component, an installation date of the component, and/or information relating to maintenance that has been performed, or that needs to be performed, on the component. Product number emitting identification tags are even less expensive, costing about 12 cents or less per tag.

Figure 2:
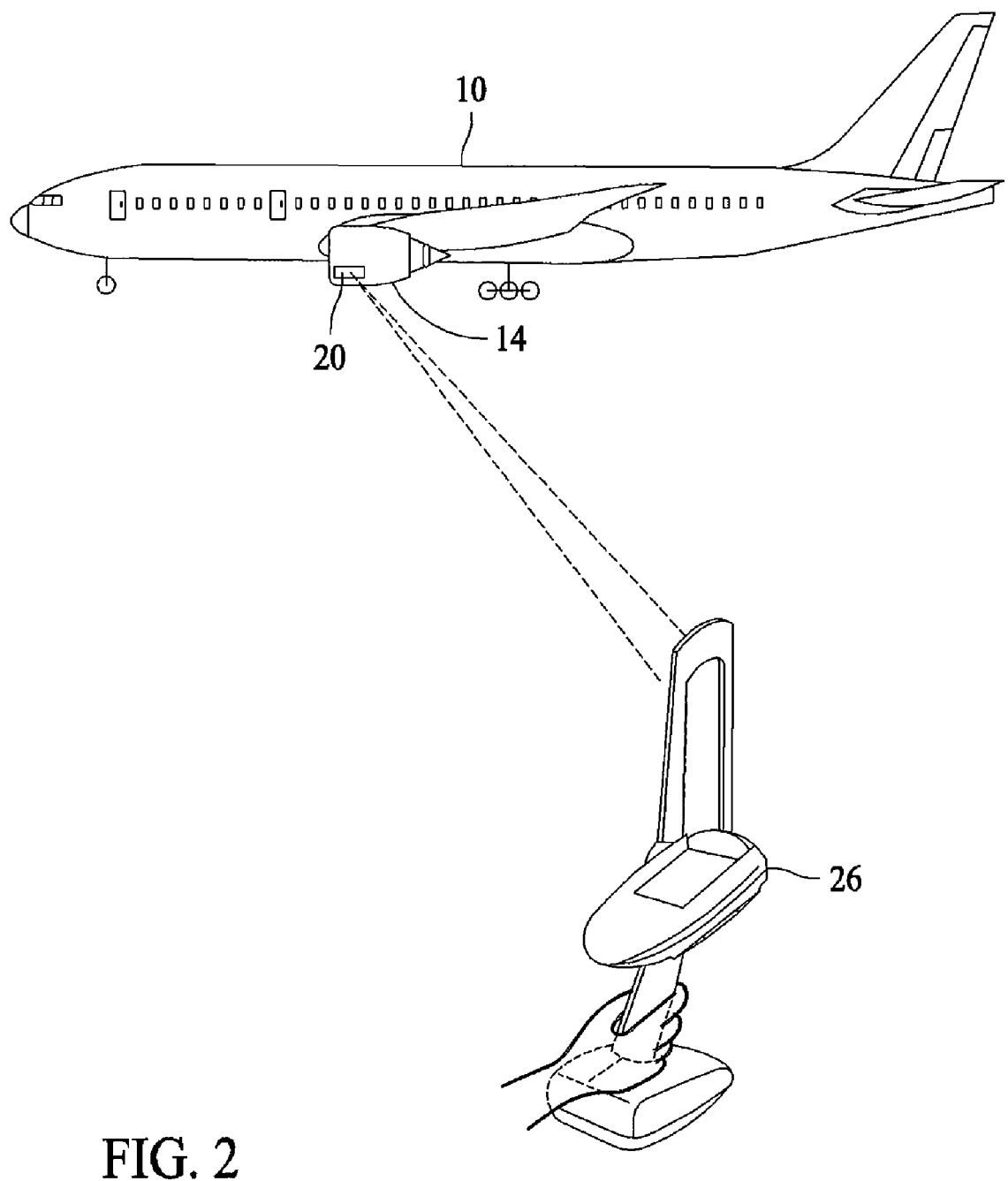
FIG. 2 is a diagrammatic perspective view of an aircraft that may be tagged and scanned using RFID tags and a handheld RFID scanning device.

As also shown in FIG. 1, a scanning system, generally indicated at 22, that may include one or more scanners 24, may be built into structures 25 such as, for example, aircraft manufacturing facility structures, aircraft maintenance/inspection facility structures, hangar doors, ramp surfaces, taxiway surfaces, etc., or may be incorporated into a hand-held scanning device 26, as shown in FIG. 2.

Whenever desired, one or more of scanners 24 or hand-held scanning devices 26 may be used to quickly and accurately determine the exact configuration of the aircraft 10, and may be used to generate a suitable report suitable setting forth the exact configuration of the aircraft 10. Such information may then be used to determine warranty status, and/or to control and verify aircraft configuration.

The scanning system 22 facilitates automatic updating and reconciliation of aircraft configuration records, and allows mechanics, quality assurance personnel, and engineers to concentrate on the job at hand and not on paper documentation and/or manual data entry of aircraft configuration information. Upon rollout from a maintenance facility, the aircraft 10 may be scanned to provide an accurate determination of the configuration of the aircraft and to identify any missed maintenance items.

In one embodiment, each aircraft that utilizes the scanning system 22 also includes at least one RFID tag for identification of the aircraft itself. This tag(s) provides data, when energized, to an RFID query/update device, identifying the aircraft to the system. This RFID tag is sometimes referred to as the "root" tag for each aircraft. In a specific embodiment, the root tag includes data relating to, or includes a pointer to, the data currently contained on the aircraft's "data plate", for example, a manufacturer name, a model number, a serial number, and a date of manufacture for the aircraft.

The system could be used by implementing the following procedure. The procedure may be initiated by attaching a passive RFID tag to each life limited aircraft part (or other part of sufficient value) at the time of manufacture or, alternatively, at the time of installation of the part on the aircraft. The tag may contain particular combinations of the manufacturer, serial number, model number, manufacture and installation dates, life limit hours, inspection limit hours and/or additional information as determined by the maintenance requirements of the part. Such tags may also include human readable data printed thereon. Each maintenance activity performed on RFID tagged parts may be added as data stored on the RFID tag to create an audit trail. Maintenance procedures would include updating the tag each time that a maintenance and/or inspection operation is conducted on a tagged part.

Periodically, a scan of information from the RFID tags may be conducted to create a census, or survey, of the RFID tagged devices on a particular aircraft. Such a census would consolidate the maintenance data for all the RFIID tagged parts on a given airframe. Software analysis of the census may then be conducted, for example, to determine when each life limited part is scheduled for inspection, maintenance or replacement, and ensures that all items on the aircraft are properly tracked and maintained. Inspection records may be generated from the census. The RFID census is a process improvement that may be used to assist in the manufacture of aircraft as well as assisting in maintaining the aircraft. By using RFID tags, no physical contact with the tag is required to read the information. The scanner need only be close enough to excite the RF-powered "front end" of the tag. The effective distance required to excite the tag is determined by the power of the scanner and the medium through which the RE energy must penetrate.

Each RFID tag may include at least three primary data elements: 1. A unique working address that may be used to interrogate and encode data from and to the tag; 2. A component identification field, that may be used to uniquely identify the component to which the tag is attached; and 3. A read/write data area that may be organized to contain the current status and history of the component.

The unique working address may be composed of:

1: The aircraft serial number to which the component is attached or a pseudo-code assigned for inventory and status tracking, for example, the tag may be configured such that when the component is attached to an airframe it always bears the airframe serial number in this field.

2: An International Civil Aviation Organization (ICAO) assigned function code may be used that defines the component type, its superior component type and sequence number, e.g., "engine fuel control/engine/2," for the fuel control on the number two engine. (This designation would most likely be defined by a committee of stakeholders within ICAO).

3: A Customer Key field without which the component will not answer an interrogation request. This prevents "fishing expeditions" by unauthorized interrogators. This address field is normally read-only for a given installation. For example, it would only be rewritten if the component is installed on an airframe, removed from its installed airframe, inventoried, changes ownership, sent to an overhaul facility or destroyed, and when the component is destroyed the tag must be surrendered to a controlling agency.

There are multiple reasons for having the working address field. First, the airframe serial component limits the responses from queries to components on an airframe of interest. This would be necessary to ensure that a response reflects the status of components of interest not random responses e.g., from adjacent aircraft on the ramp. Secondly, the ICAO designator field(s) forces a discipline and uniformity on component manufacturers, etc., and allows the interrogator to focus attention on specific components when necessary or desirable. This type of query will probably account for most interrogations. Wild card inquiries may be permitted to gain responses from all (or a subset) of components attached to a superior component, or alternately all of a given type of component.

The listed three data elements are to be considered as examples only. As further described below, other embodiments exist that include other combinations of relevant aircraft component identification, configuration and maintenance data.

The unique component identification may be a read-only field written by the original manufacturer that identifies the manufacturer, model, serial, ICAO functional designation, and date of manufacture of the component. It may also contain a superior/inferior component function list, e.g., "fuel igniter" (engine or auxiliary power unit (APU)).

Read/Write data area. This area may contain the pertinent history of 10 the component including, for example, date of original installation, date of last inspection, time in service, time since overhaul, satisfied AD list etc. The formal and content of this area may be defined by appropriate maintenance software and standards organizations. This area may be updated each time a defined event takes place and may be configured as a push down list containing the entire history of the component. The first entry in the list may contain the last event affecting the component and reflects the current status of the component.

In addition to the above data fields, in one embodiment, each tag contains a unique serial number assigned by its manufacturer that would enable the manufacturer to recover the data under extenuating circumstances. Such a recovery process may require physical access to the tag to function.

In other embodiments, the data areas are encrypted to prevent unauthorized disclosure. The encryption algorithm and encryption key management is included in software supplied under license to customers (e.g., airlines), OEMs, and maintenance, repair and overhaul (MRO) facilities, etc. The encryption key may be the property of the aircraft owner who could authorize the use of its key by its maintenance facilities, suppliers, and regulatory agencies under its supervision.

Layered software allows the customer to select the level of service it wishes to obtain, from complete turn key maintenance to management/audit systems to a set of basic library routines the customer is able to integrate into its own systems, e.g., software that performs the interrogation and read/write of the data on the RFID tags. Additionally, an authorization process may be implemented via a software program whereby an individual RFID tag responds only to authorized query/update requests.

The data format and content of the read/write area depends on the requirements of the component and thus may be defined by standards bodies familiar with the components in question.

Thus, in accordance with the invention, a system and method is provided to scan an entire aircraft 10, for example, while it is towed through an opening such as a hangar door, in order to determine the exact configuration of the aircraft 10, and/or to ascertain information (e.g., maintenance history) about one or more components of the aircraft 10. Advantages to such systems and methods include increasing the accuracy of determining aircraft configuration, decreasing labor required to determine and document aircraft configuration, reducing errors, and reducing costs associated with maintaining aircraft components. As described above, each aircraft 10 utilizing the herein described RFID system includes at least one RFID tag which defines the aircraft itself to the system. This root tag contains, or provides a pointer to, at least the data currently contained on the data plate of aircraft 10, for example, the manufacturer name, the model number, the serial number, and the date of manufacture. RFID tags employed on an aircraft 10, or a given aircraft's components may include different data storage and processing capabilities depending on the data requirements of each component's maintenance process.

Evaluating maintenance history of critical aircraft components in place would reduce cost and increase safety of aircraft by making it easier and to identify parts on an aircraft without physical removal and inspection, and is particularly useful for life-limited parts that are difficult for a mechanic to reach or remove. The system described herein provides an efficient system and method for documenting maintenance procedures and ensuring that all appropriate maintenance actions have been conducted.

The system may also be used for conducting a preflight inspection of the aircraft 10, in a simpler fashion than that currently used. For example, a walkthrough of the cabin of the aircraft 10 with the hand-held scanning device 26 could inventory all life vests and rafts, each of which may be tagged with an RF1D tag, prior to an overseas flight.

Figure 3:
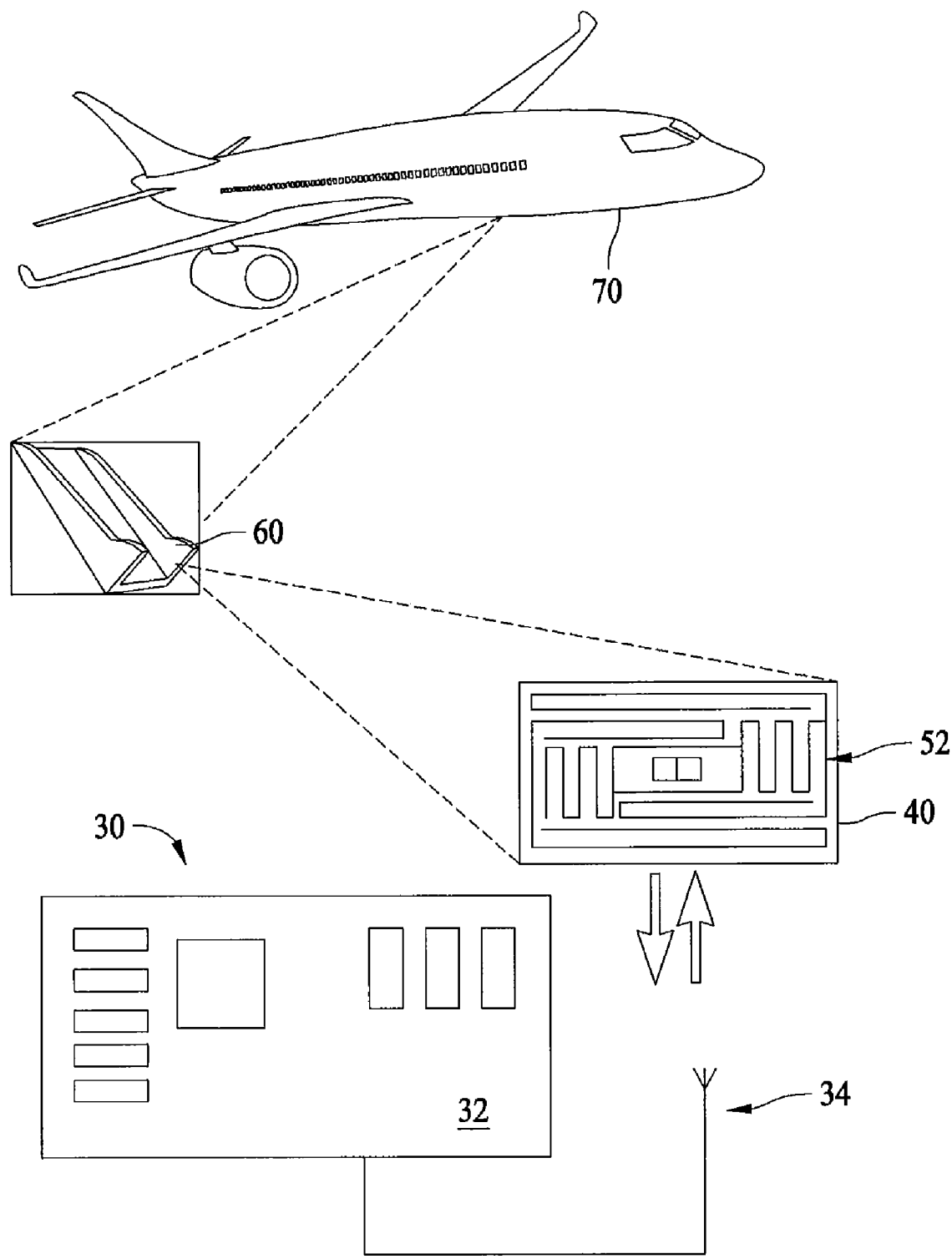
FIG. 3 is a depiction of a system for identifying aircraft parts, at least in part to perform maintenance.

An analogous system for identifying aircraft component parts is illustrated schematically in FIG. 3 and indicated by reference numeral 30. The exemplary aircraft component identification system 30 is further configured to perform a portion of a method for aircraft maintenance, in conjunction with the above described embodiments, in which mistakes are reduced or eliminated as compared to known aircraft maintenance methods. The maintenance methods includes accurate identification of specific aircraft component parts having one or more programmable RFID tags 40 affixed thereto as described above. Identification of a particular aircraft component includes transmission of a maintenance data file that includes data representative of the aircraft component maintenance history. The exemplary system 30 for identifying aircraft component parts includes, for example, a reader/ programmer 32 including an antenna 34 and at least one RFID tag 40. The RFID tag 40, which may be a passive read-write chip, is affixed to an aircraft component, such as a seat 60 on an aircraft 70. It is to be understood that a plurality of RFID tags 40 are each affixed to component parts of an aircraft 70 that require identification.

In one embodiment, passive RFID tag 40 is of a reader talk first protocol, has an extended twenty year service life and is authentication and encryption capable. Antenna 34 is tuned to receive signals transmitted by the RFID tag 40 affixed to the object, such as aircraft seat 60. The signal transmitted by the RFID tag 40 is a radio-frequency (RF) signal (i.e.) not requiring a line of sight), carries an identifier code unique to aircraft seat 60 with which the RFID tag 40 is associated. The frequency spectrum in which the RFID tag 40 and the reader/programmer 32 communicate in one exemplary embodiment is between 850-960 MHz (915 MHz is the center frequency). In an embodiment in which tag 40 is passive, the antenna 34 propagates energy from the reader/programmer 32 to generate an electric field which energizes or activates RFID tag 40, which may include up to 64K bytes of read/write memory, to transmit the data in the memory when the reader/programmer 32 is within an appropriate range of RFID tag 40.

Upon receipt of the activation signal from the reader/programmer 32, the RFID tag 40 transmits a data signal to the reader/programmer 32. As FIG. 3 shows, communication between the reader/programmer 32 and RFID tag 40 is bi-directional, and reader/programmer 32 may be used to transmit updated maintenance details for a relevant aircraft component. In the embodiment, individual RFID tags respond only to authorized query/update requests in which the RFID tags are programmed via an authorization process which may be implemented in a software program.

The aircraft component identification system 30 is exemplary because, as part of identifying specific aircraft components, it also identifies the maintenance history of the component. For example, if there had been four or five maintenance jobs performed on seat 60, because RFID tag 40 is a read-write device, there is a record of each repair stored in RFID tag 40 so that when mechanics are performing system checks, they have complete information on when each of the four or five repairs were performed and exactly the type of maintenance that was performed without having to hold aircraft 70 on the ground while a maintenance engineer locates the maintenance log book for seat 60, or the actual engineering work order for prior work performed on seat 60. While maintenance on seat 60 is described herein, it is to be understood that seat maintenance is simply one example for which the methods and systems described herein are or can be applied.

Figure 4:
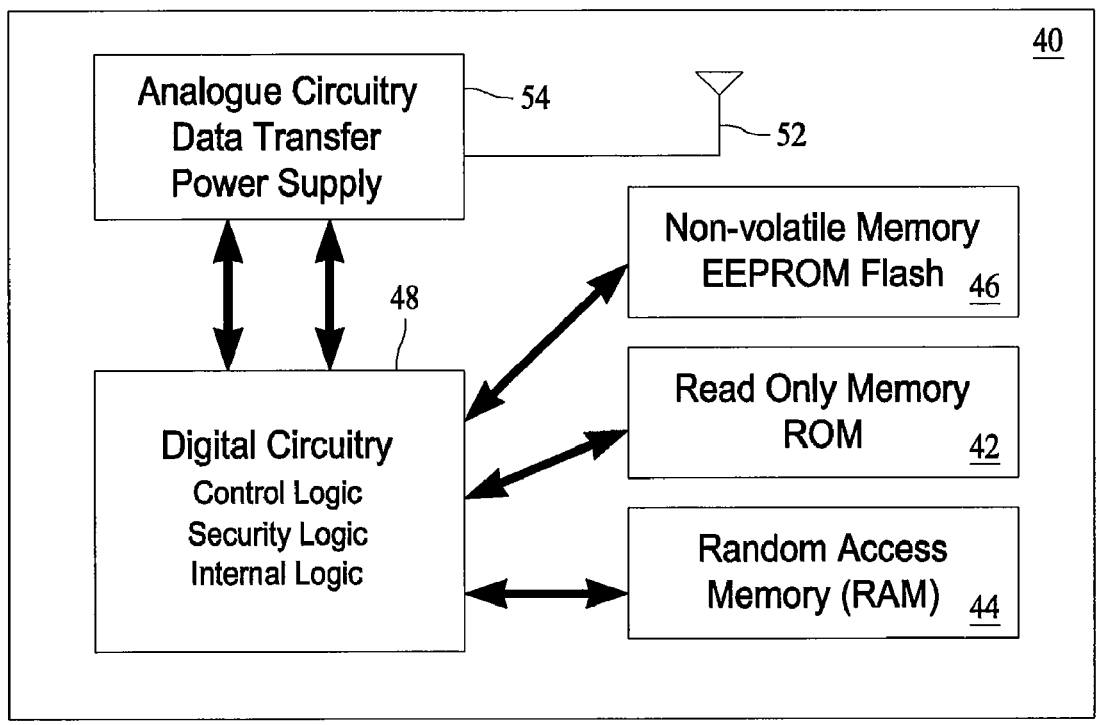
FIG. 4 is an illustration of the basic components of an RFID tag.

RFID tag 40 responds to a transmitted or communicated request for the data it carries. More specifically, RFID tag 40 responds by transmitting an RF signal to the reader/programmer 32. The basic components of an RFID tag 40 are illustrated in FIG. 4. Specifically, in at least one embodiment, RFID tag 40 complies with human readable and permanent barcode identification guidelines of ATA SPEC 200 Chapter 9, environment tests per DO 160E requirements, and air interface in accordance with ISO 18000-6B. Generally speaking RFID tags, such as RFID tag 40, are fabricated as low power integrated circuits suitable for interfacing with external coils, or utilizing "coil-on-chip" technology, for data transfer and power generation. In one embodiment, one or more RFID tags are configured with a unique network address, sometimes referred to as a media access control (MAC) address, which is assigned by the RFID tag manufacturer.

As illustrated in FIG. 4, the (transponder) RFID tag 40 includes memory that may comprise read-only memory (ROM) 42, random access memory (RAM) 44 and non-volatile programmable memory 46 for data storage. In certain embodiments and as described above, software embedded in the RFID tags cause the tags to recognize and respond only to authorized inquiry and update requests, and to format and process information for storage and retrieval purposes as required. Processors and non-volatile storage within the RFID tags are sufficient to store codes and information used to process legitimate and authorized requests directed to the tags.

In one embodiment, the ROM-based memory 42 is used to accommodate security data and the transponder operating system instructions which, in conjunction with the processing logic within digital circuitry 48, deals with the internal "house-keeping" functions such as response delay timing, data flow control and power supply switching. The RAM-based memory 44 is used to facilitate temporary data storage during transponder interrogation and response. The nonvolatile programmable memory 46 may take various forms, electrically erasable programmable read only memory (EEPROM) being typical. It is used to store the aircraft component part identification data, along with the maintenance history file. This memory needs to be non-volatile to ensure that the data is retained when the device is in its quiescent or power-saving "sleep" state.

Data buffers are further components of memory, used to temporarily hold incoming data following demodulation and outgoing data for modulation and interface with RFID tag antenna 52. Interface circuitry 54 provides the facility to direct and accommodate the interrogation field energy for powering purposes in passive transponders (RFID tags) and triggering of the transponder response. Where programming is accommodated, facilities must be provided to accept the data modulated signal and perform the necessary demodulation and data transfer processes. The transponder antenna 52 is the means by which RFID tag 40 senses the interrogating field generated by the reader/programmer 32 and, where appropriate, the programming field RFID tag antenna 52 also serves to transmit the transponders (RFID tag 40) response to interrogation.

In operation, a technician causes the reader/programmer 32 to be within an appropriate distance of a particular RFID tag 40 and then causes reader/programmer 32 to transmit an interrogation signal, which is received by RFID tag 40. In response, RFID tag 40 transmits its data signal to the reader/programmer 32 where the RFID tag data signal is processed and displayed on the screen of the reader/programmer 32. In one embodiment, the reader/programmer 32 is a hand-held device. However, it is contemplated that the reader/programmer 32 may also be a larger mobile device or a stationary device positioned within the areas where maintenance is performed. Reader/programmer 32 may also consist of multiple combinations of hand-held devices, larger mobile devices, and stationary devices. The data displayed on the reader/positioned programmer 32 is generally of the types disclosed in Tables 1, 2 and 3. Table 1 is an illustration of basic component data information that is generally included in a label affixed to any aircraft component. However, the information included in Table 1 should not be construed as limiting.

TABLE 1

Basic Component Date Information

Serial Number
Part Number
Manufactured date of the component
Revision level of the component (whether it has been modified or not)
Activity of the component
The block number of the airplane it applies to
Serviceability of the equipment The information set forth in Table 1 is the basic information that is at least partially found today on a metal or paper data plate that has been either glued or physically attached to an aircraft component. In prior systems, in order to gain access to the information set forth in Table 1 on a data plate, the technician was required to gain a physical line of sight in order to read the data plate. In order to gain a physical line of sight, the technician may have had to remove one or more panels and other aircraft components. In addition, information concerning serviceability of the component is typically found on a separate tag/label called an 8130, which is a federally required tag that is attached to the component when it is shipped from an Original Equipment Manufacturer (OEM). In the case of the present invention, inclusion of the information set forth in Table 1 in RFID tag 40 data storage allows the mechanic to view critical component information without direct line-of-sight view of the data plate or label affixed to the component. Accordingly, the aircraft component identification system described herein provides a capability whereby configuration checks can be accomplished without panel removal. Storage of electronic data on RFID tag 40 representative of basic component data greatly reduces the need for repetitive information entries typical of the paper environment, which also reduces human error in data entry. In other embodiments, data within an RFID tag may include a URL pointer to a data base process that contains the maintenance history of the aircraft or aircraft component. Alternatively, the RFID tag may include some or all of the maintenance and or regulatory data history for the aircraft component as well as the maintenance and regulatory data requirements of the aircraft component.

Figure 5:
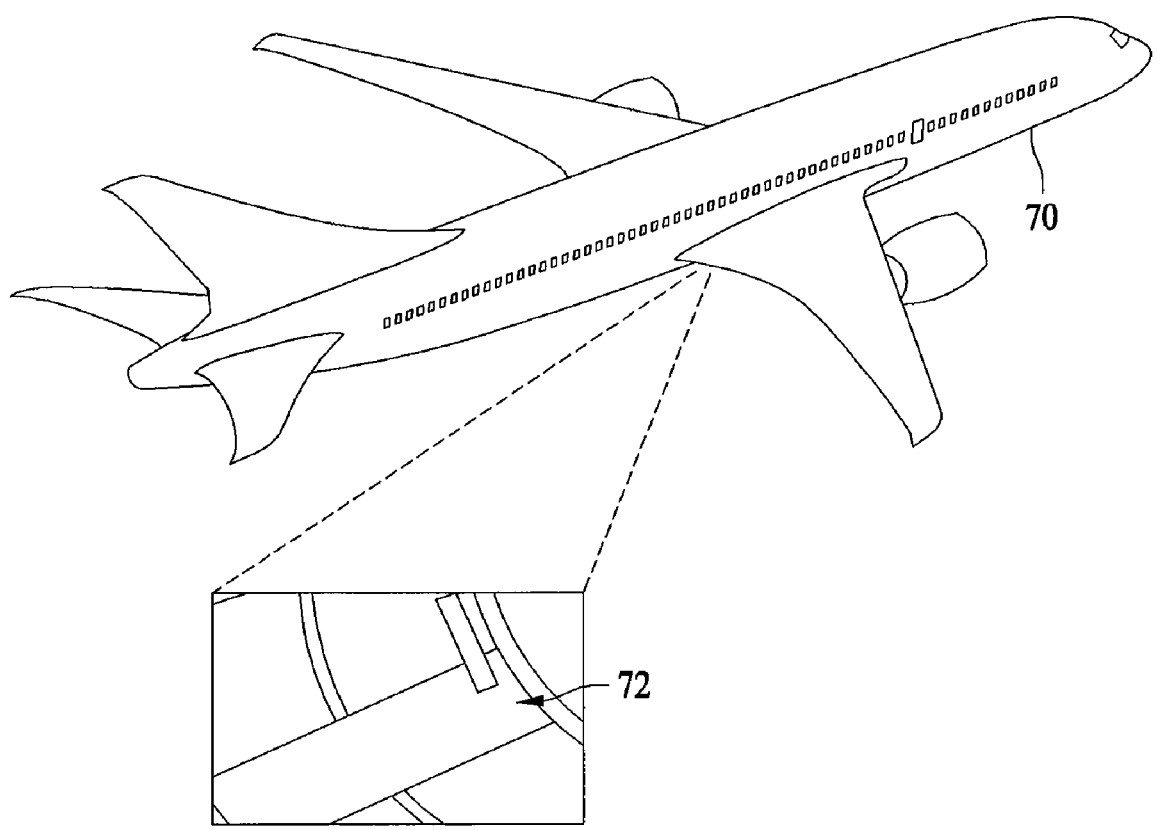
FIG. 5 is an example of an application for tracking aircraft utilizing RFID tags.
Figure 6:
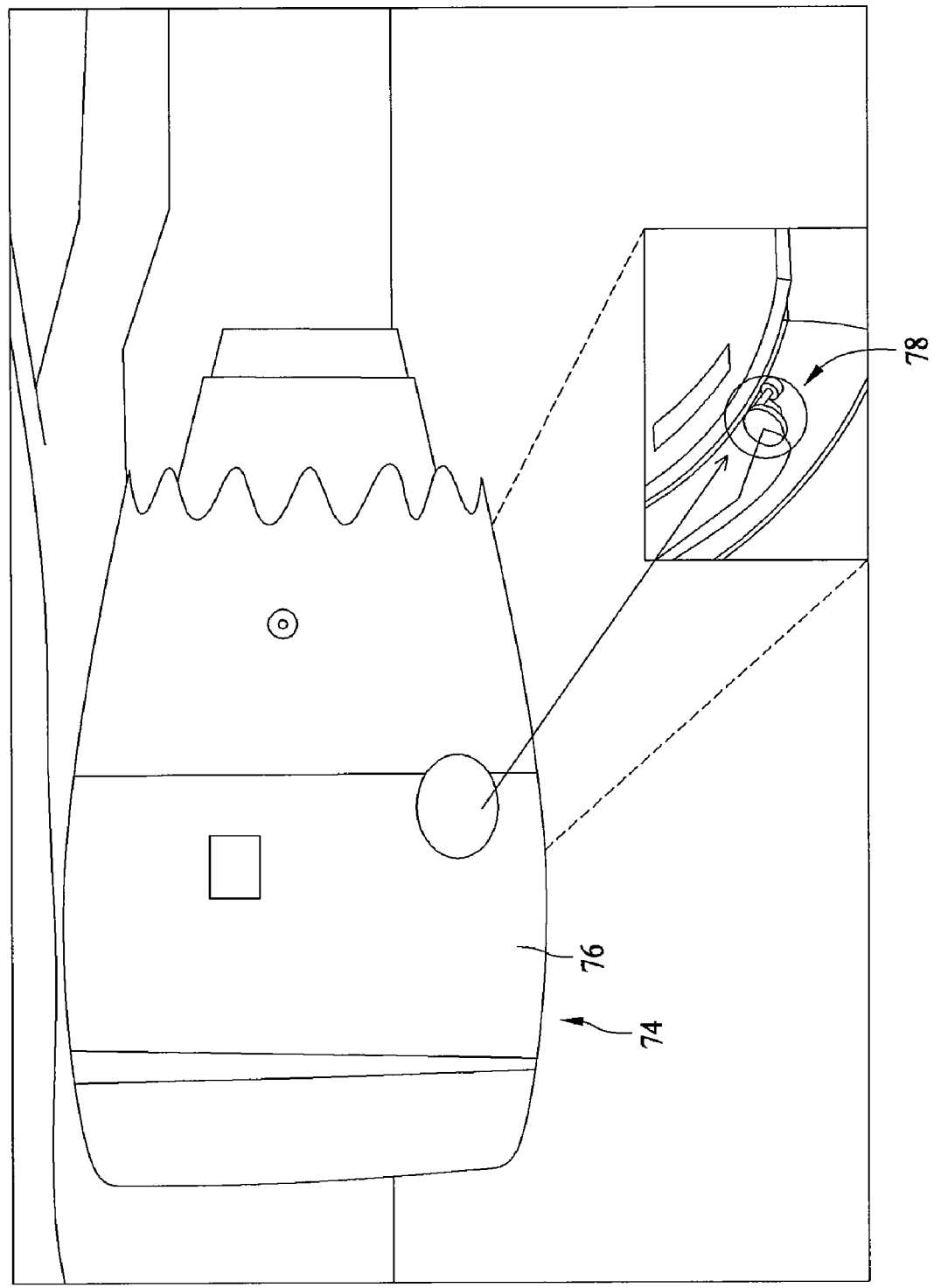
FIG. 6 is an example of an application for tracking aircraft engines utilizing RFID tags.
Figure 7:
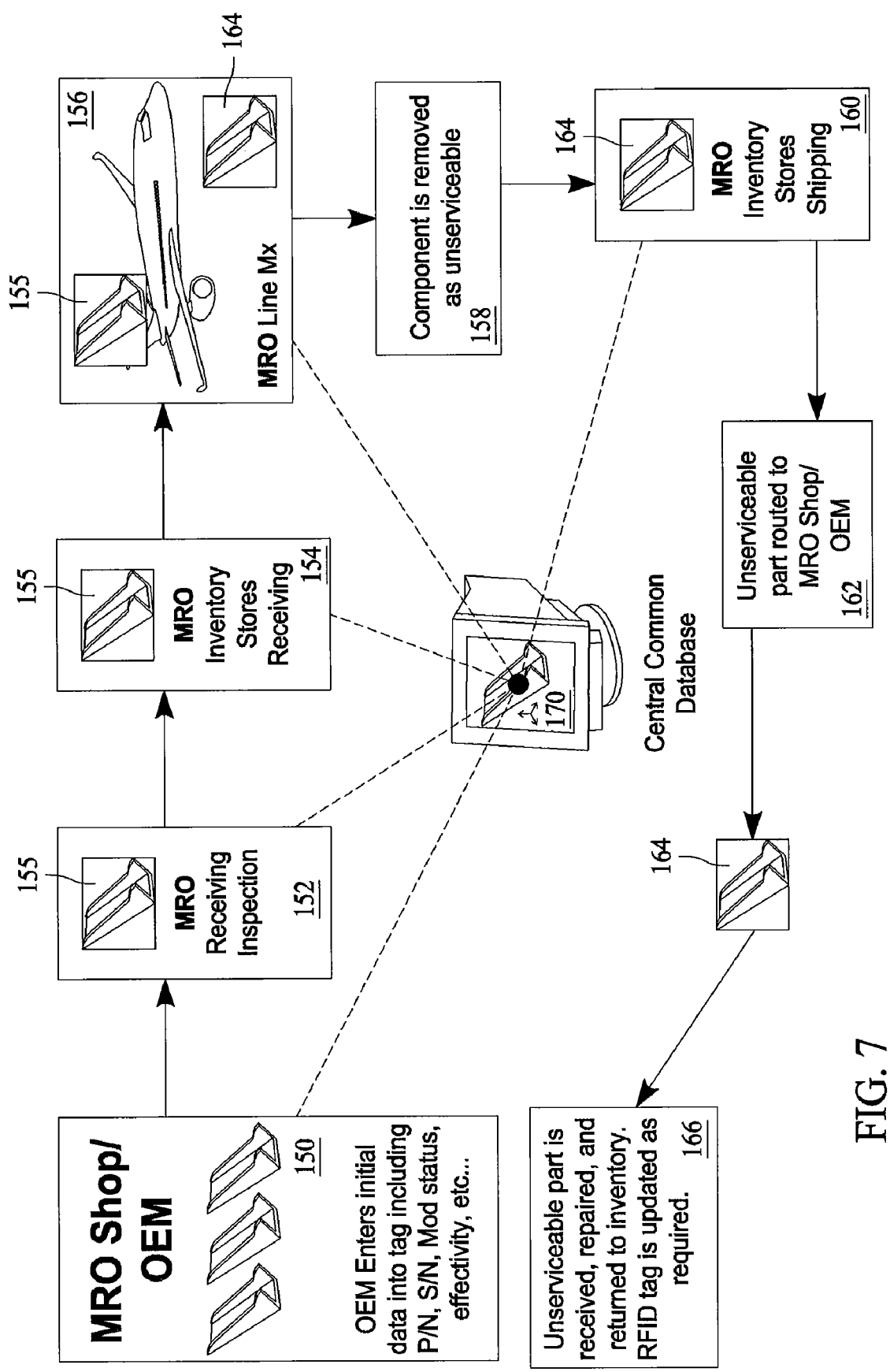
FIG. 7 is an illustration of product life cycle.

One example of an application of the herein described embodiments is shown in FIG. 5, which illustrates an enhanced area of detail of the inside of the fuselage of aircraft 70, where a ram-air turbine 72 is positioned. FIG. 5 is illustrative of a scenario where a line mechanic has to verify an effectivity of the aircraft's ram-air turbine 72. In this example, the line mechanic may verify the effectivity of the ram-air turbine, for configuration purposes, by verifying the serial number of the ram-air turbine 72 on the aircraft 70. Without the use of the present invention, the mechanic would perform verification by to removal of an access panel on the aircraft's fuselage, lowering of the ram-air turbine 72 and visually checking the serial number on the data plate affixed to the ram-air turbine 72. The present invention allows the line mechanic to verify the serial number of the ram-air turbine 72 by positioning reader/programmer 32 in proximity of the fuselage. FIG. 6 illustrates another example of how a mechanic can approach an aircraft engine 74 and identify components within the engine 74, behind the cowling 76, such as engine component 78, without removing engine 74 side panels. The present invention enables the mechanic to access data stored on the RFID tag of engine component 78 without opening the aircraft's engine bulkhead in order to verify engine component 78.

The embodiments described herein enhance public safety by eliminating unneeded removal of panels and components from aircraft 70. Currently, simply due to mechanics trying to identify failed components, many panels and many electronic and mechanical components are needlessly removed from aircraft. The enhancement to public safety comes from the lack of removal and replacement of electronic and mechanical components and portions of the aircraft structure that are otherwise perfectly fine. The embodiments described herein reduces the handling of components that do not currently require maintenance.

The information set forth in Table 2 below is comprised of serviceability data associated with a particular aircraft component. Again, the content of Table 2 should not be construed as limiting.

TABLE 2

Serviceability Information

Typical 8130 serviceability record
Previous maintenance record - Time Since Overhaul (TSO)
Installation date
Required maintenance data - Time Before Overhaul (TBO)
Special modification Engineering Standard Order (ESO)
Air-worthiness Directive and Service Bulletin compliance
No Fault Found (NFF) history Serviceability information concerns the aircraft component's actual serviceability. Typically the information within Table 2 is provided on paper records that are maintained for every serviceable component. When a mechanic services a component, they are provided paper records that they are required to update, by including thereon information such as the mechanic's name, their license number, employee number, etc., along with information in Table 2. Providing the information in Table 2 by way of an RFID tag associated with the serviceable component allows the mechanic substantially instant access to any data of the type set forth in Table 2 that is associated with such a component. The mechanic can view and update "living data" immediately. It provides an aircraft inspector with essential component history and quickly identifies unusual configurations and/or modifications. It also allows the history of NFF to be tracked for the purpose of root-cause-analysis. Accordingly, a technician has access to the complete history of a serviceable component and only has to input updated information concerning a component to the extent any maintenance is proposed or actually performed thereon.

Providing this information allows the overhaul mechanic to view specific essential operational information that might be used for troubleshooting problems. Such information allows two-way communication between mechanics on the line and in the shop. It allows the overhaul mechanic to have instant access to prior technical service orders, the date that the part was installed in the airplane and required maintenance information done before overhaul. This is especially useful for life limited parts and components that are restricted to a predetermined number of cycles or hours of operation. It also makes available information relating to special modifications. For example, if the mechanic is replacing a hydraulic actuator and at the attach point, the mechanic noticed that the bushing is unusual (e.g. bushing to be installed is of a different type of material than the bushing on the actuator that is being removed), the RFID tag 40 would explain why. The mechanic would be able to see that there was an upgrade, or a service bulletin was actually performed on the part.

Currently, when a mechanic is troubleshooting a problem on an airplane, and a solution to the problem is not easily found, they sometimes revert to a "shotgun method", where the effort to solve the problem is accomplished by simply pulling multiple components off of an aircraft, hoping that replacing a part will fix the problem. Generally, these parts are removed and replaced without isolating or fixing the current problem. Under those circumstances, the removed part would have a no fault found data entry associated with it, explaining that removal and/or replacement of the part did not solve the problem. If that No Fault Found history continues, then there would definitely be need for a more thorough analysis. Utilizing the embodiments described herein, a technician is able to go back into the history of the maintenance of the airplane and find out why other mechanic(s) have been led to replace a particular component every time a specific fault occurs. In some cases, the mechanic will find problems with the performance of the component removed by this method. But, overall, it is an effective method of solving problems.

The information set forth in Table 3 below is comprised of un-serviceability data, which, in the past, a technician was required to include on another form when the component was removed from the aircraft.

TABLE 3

Un-Serviceability Information

Date and time part removed
Operating conditions
AHM data noted at time of removal
Reason for removal
"Un-serviceable" signal The embodiments of system 30 (shown in FIG. 3) allow for storage of all the information set forth in Tables 1, 2, and 3 to be stored on the RFID tag 40 of the component being removed from the aircraft. With utilization of the system for identifying aircraft component parts, all of the above information would already be included in RFID tag data storage and made available to the overhaul mechanic instantly. The unserviceability information relates to components that are removed from the airplane. When a component is removed from the aircraft, the service mechanic is required to identify the component as unserviceable, including taking notes on what is wrong with the component and noting when and why it was removed. Previously a mechanic would record such information concerning a component that has been removed from an aircraft on a paper form. There is limited space on the form so limited information can be recorded. In addition, the mechanic on the floor or at the line station never has an opportunity to discuss the component with the mechanic at the bench who is to repair the removed component.

Therefore system 30 provides a mechanism through which a mechanic that removes components from an aircraft may communicate by including information concerning the condition of the component at the time it was removed (mechanic notices that the component was under an extreme operating condition, for example, component was extremely hot) to the technician who will repair the component. Another scenario would be, at the time of component removal, the mechanic is made aware of unique characteristics of the component's operation which can be stored on the RFID tag and thereby forwarded on to the repair shop where the shop mechanic will have access to that information and can use it during repair. It may assist the mechanic in identifying the problem with the component which may result in the shop mechanic communicating back to the line mechanic why the component failed and in some situations advise the line mechanic that the component failure is a symptom of another related system on the verge of failing. The mechanics involved with maintaining an aircraft can create libraries of information concerning components that may identify trends.

As explained above, an important aspect of the system for identifying aircraft components and accessing/providing data associated with such components is in its ability to centralize all data concerning components and make such data instantaneously available. System 30 is also configured to allow a mechanic to add more detailed and meaningful information into the aircraft maintenance process. FIG. 6 illustrates an entire life cycle of a product from its initial delivery from its OEM, to its removal from an aircraft, back to its original manufacturer for repair. An original equipment manufacturer produces each aircraft component with RFID tags 40. The OEM enters 150 the initial data into the RFID tag 40, including at least data representative of basic component data such as that described with respect to Table 1.

This initial RFID tag data entry covers an airworthiness directive (AD), which is typically issued by the FAA or other national regulatory authority. Compliance with ADs is mandatory and required within a specific period of time. If compliance has not been achieved within that period of time, an aircraft may no longer be operated. In addition to AD compliance, the initial RFID tag data entry includes serial numbers, part numbers and any other information associated with that component, for example, what airplane it can be used on, etc. The OEM delivers the components 155 to the Maintenance Repair & Overhaul (MRO) provider (company to which the airline contracts with to perform aircraft maintenance and repair). When the MRO receives the component, the component 155 goes through a receiving inspection 152 and the first RFID tag benefits may be seen. Because data from Table 1 has already been entered onto the RFID tag, when a receiving inspector at the MRO receives the component, there is no need to input basic component data from Table 1 into a database. The inspector can simply scan that information into a central common database 170 by transmitting such data from a programmer/reader 32.

Next, the inspector sends the aircraft component to the inventory store where it is received 154 and stored until it is to be used. Again, the inventory clerk has no need to perform data entry into a system concerning basic component data representative of data from Table 1 (data plate history), because, this information is already stored in RFID tag 40, and may be transmitted by the reader/programmer 32 to the central common database 170. The clerk simply has to reflect receipt of the part and where it is being stored. Next, when a mechanic actually needs the component 155, which may be new or repaired, the new or repaired component 155 is sent directly to the aircraft and is installed 156. At the time of installation, the mechanic updates the RFID tag with installation data including date and time the component was installed, and the conditions under which the component was installed. The component 155 remains on the aircraft until it is removed 158, as being unserviceable, and replaced with a new component 155. The removed component 164, which has been designated unserviceable, is sent back to a MRO receiving facility 160. The component 164 is packed by the inventory clerk, the RFID tag 40 is scanned and the component 164 is shipped back to the MRO shop or to the OEM 162, so that the component 164 may be repaired. The unserviceable component 164 is received at the MRO shop or the OEM 162 and again, that mechanic can scan the tag 40 and see the entire life history of component 164. The technician can see what failed, when it failed, what the conditions were at the time of failure, and who the mechanic is that removed the component from the aircraft. The technician can access everything that has been stored within RF10 to 40 which may help diagnose the problem with the component 164. Next, the component 164 is repaired 166 and put back in stock and it starts the cycle all over again 150.

If a fault occurs and the fault is fed into the aircraft central data computer the aircraft has the ability to advise of the most likely component that needs to be replaced. With that knowledge, the mechanic has an idea of the component on the aircraft that may need to be replaced. Use of an aircraft program called Parts Identification Management System (PIMS) and that provides a general location of the component. So before a mechanic begins opening doors and panels to locate a component by line of site, the PIMS program provides some information concerning the components general location.

Figure 8:
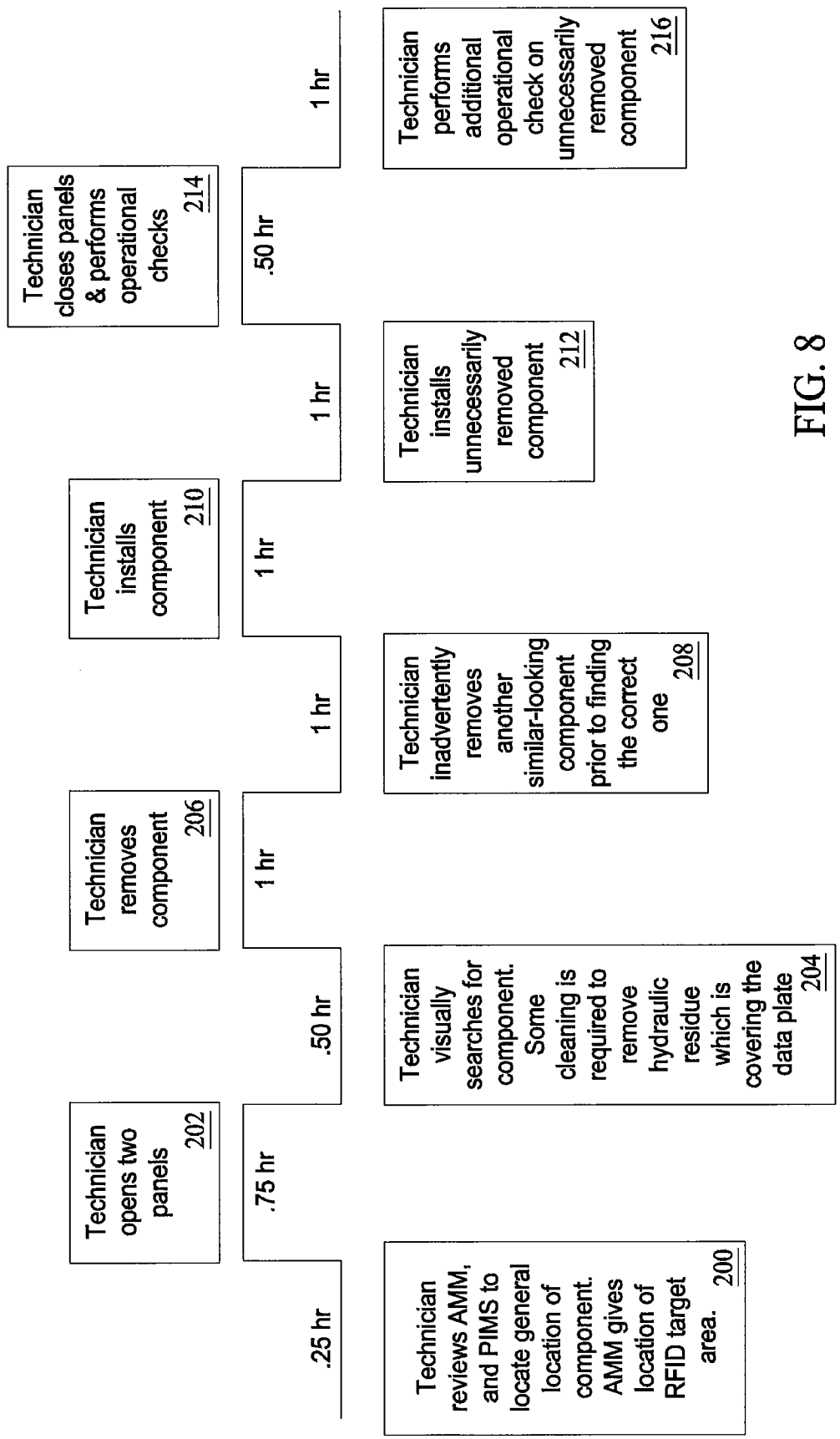
FIG. 8 is depiction of total cycle time for component identification and removal using conventional techniques.
Figure 9:
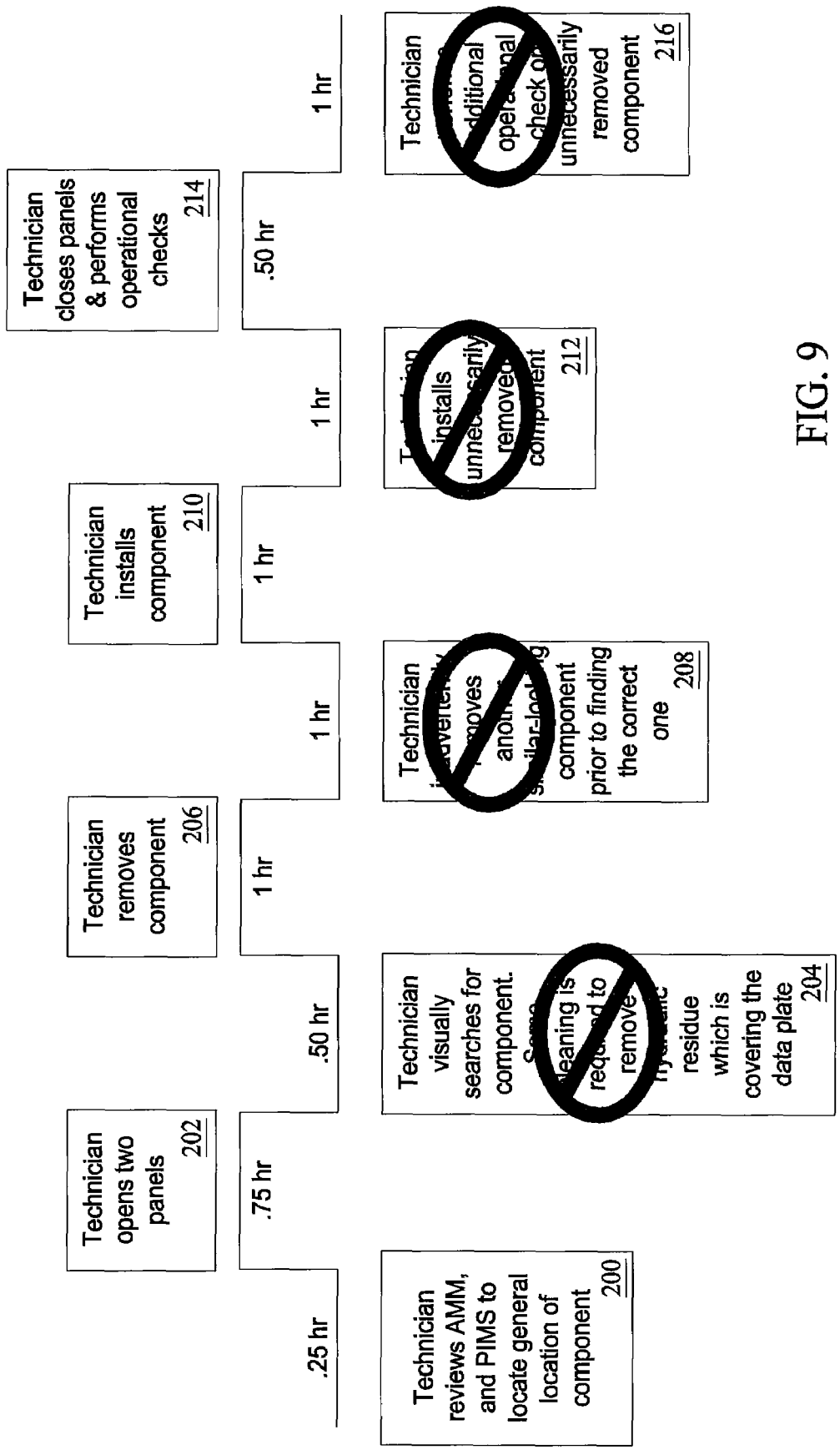
FIG. 9 is a depiction of total cycle time for component identification and removal utilizing RFID tag techniques.

FIGS. 8 and 9 illustrate the value the component identification system adds to the maintenance stream by facilitating a method that reduces or eliminates mistakes in known aircraft maintenance, by eliminating specific tasks that routinely occur in known maintenance processes. FIG. 8 illustrates the steps in an example maintenance process performed without the use of reader/programmer 32 and RFID tag 40 of system 30. For example, when a problem is detected, a technician spends approximately one-quarter hour reviewing the Aircraft Maintenance Manual (AMM) and Parts Identification Management System (PIMS) to locate the general location of a component to be checked 200. Upon identifying the general location, the technician spends approximately three-quarters of an hour opening two panels in an effort to locate 202 the component. Next, the technician visually searches 204 for the component. Because cleaning is required to remove residue covering the component data plate, the technician spends additional time cleaning the component. Next, the technician spends about one-hour removing the component 206. It is possible that the technician will inadvertently remove another component that looks substantially similar to the component the technician desires to remove, which causes the technician to spend an additional time removing and replacing unnecessary components.

Next, technician spends time installing the component designated for removal. Next, technician spends additional time installing unnecessarily removed component 212. Next, the technician spends an additional one-half hour closing panels and performing operational checks 214. Finally, the technician spends and additional one-hour performing additional operational checks on the unnecessarily removed component 216. The total cycle time for the component identification and removal in the maintenance process illustrated in FIG. 6 is about seven hours. This maintenance process was substantially lengthened by the mechanics inability to accurately identify the appropriate component designated for removal.

FIG. 9 illustrates, an example cycle time for identification and removal of the same aircraft component when the component identification system and the methods for aircraft maintenance described herein are implemented. As illustrated, use of the system and the method for aircraft maintenance reduces the time spent on maintenance in the sequence set forth in FIG. 8 by fifty percent. This is accomplished by eliminating the technician tasks associated with visual identification 204 of the product to be serviced, inadvertent removal of other components 208 and the reinstallation 212 and operational check of components inadvertently removed 216. Using RFID tags and the component identification system of the present invention provides countermeasures for technician errors that will reduce and may eliminate altogether the inadvertent removal of components and panels, while also greatly reducing operational checks of disturbed systems. The maintenance sequence set forth in FIG. 8 was reduced from seven hours to three and one-half hours as FIG. 9 illustrates.

Figure 10:
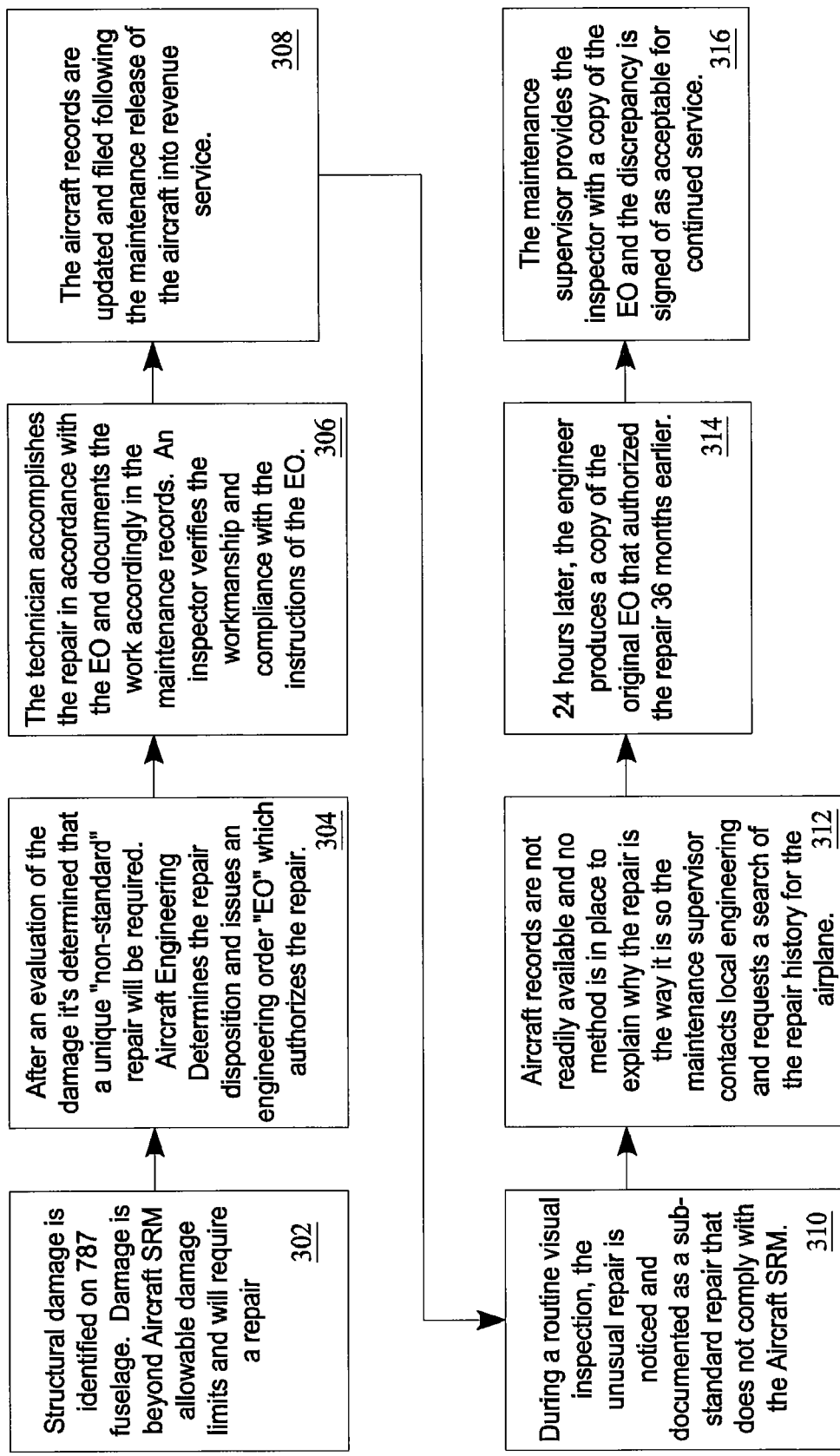
FIG. 10 is a depiction of a structural damage identification process.
Figure 11:
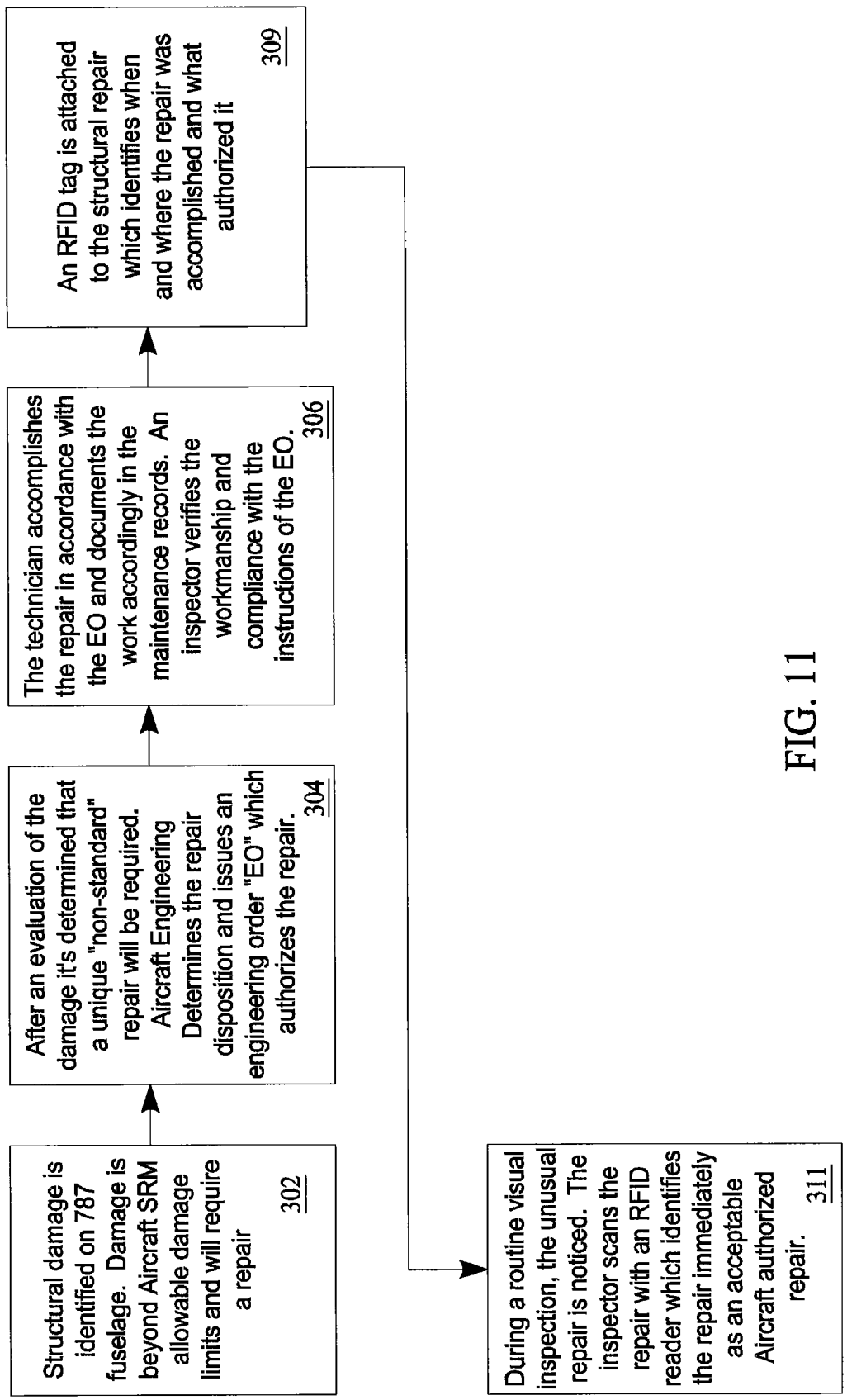
FIG. 11 is a depiction of the structural damage identification process utilizing RFID tag techniques.

Another illustration of the value added to the maintenance process by the method of maintenance facilitated by the aircraft component identification of system 30 in FIGS. 10 and 11. Maintenance is facilitated by making a majority of, if not all, component and maintenance data readily and instantaneously available on each component of an aircraft. Inclusion of this information with the component allows for instantaneous understanding of the maintenance history and special circumstances surrounding component repairs. For example, as illustrated in FIG. 10 a mechanic identifies structural damage on a 787 fuselage. The damage is beyond allowable damage limits and will require a repair 302. After an evaluation of the damage, the mechanic determines that a unique "non-standard" repair will be required. The aircraft manufacturer's engineering department determines the repair disposition and issues an Engineering Order which authorizes the repair 304. Next, the technician accomplishes the repair in accordance with the Engineering Order and documents the work accordingly in the maintenance records. An inspector verifies the workmanship and compliance with the instructions of the Engineering Order 306. Next, the aircraft records are updated and filed following the maintenance release of the aircraft into revenue service 308. The Engineering Order generated at the step 304 and the documentation concerning work performed in accordance with the Engineering Order at step 306 is all recorded on paper. The papers are stored at a location at which Engineering Orders and maintenance records for the specific aircraft are maintained.

The aircraft with the repaired fuselage will remain in revenue service for several months and even years until during a routine visual inspection, the unusual repair is noticed and documented as a substandard repair that does not comply with the aircraft SRM 310. Next, because the aircraft records are not readily available and no method is in place to explain why the repair that took place pursuant to the Engineering Order in step 304, the maintenance supervisor contacts local engineering and requests a search for the repair history of the aircraft 312. Next, after about 24 hours, the local engineering department produces a copy of the original engineering order that authorized the repair several months earlier 314. Next, the maintenance supervisor provides the inspector with a copy of the engineering order and the discrepancy is signed off on as acceptable and the aircraft is authorized for continued service 316.

The entire process described in FIG. 10 is performed without the utilization of reader/programmer 32 and RFID tag 40 of system 30. When system 30 is utilized for circumstances wherein structural damages are identified on an aircraft fuselage, the steps performed in FIG. 11 are illustrative of how utilization of reader/programmer 32 and RFID tag 40 reduces needless ground time of an aircraft by facilitating improved maintenance methods. In the process illustrated in FIG. 10, grounding was the result of maintenance history data not being readily available so that a maintenance technician may check prior maintenance performed and authorized engineering orders.

As illustrated in FIG. 11, following the identification of structural damage on an aircraft's fuselage, if it is determine that damage is beyond the aircraft's SRM allowable damage limits, repair will be required 302. Following an evaluation of the damage it is determined that a unique non-standard repair will be required. Aircraft engineering determines the repair disposition and issues an Engineering Order that authorizes the repair 304. Next the technician accomplishes the repair in accordance with the Engineering Order and documents the work accordingly in the component RFID records. An inspector verifies the workmanship in compliance with the instructions of the engineering order 306. Next, an RFID tag is attached to the structural repair, which identifies when and where the repair was accomplished and what authorized the repair 309. Alternatively, the component RFID is encoded with data concerning the structural repair. At some time in the future, a routine visual inspection shall uncover the unusual repair. The inspector scans the repair with RFID tag reader/programmer, which identifies the repair immediately as an acceptable repair 311 authorized by the aircraft manufacturer. The aircraft maintains its status as acceptable for continued service and no loss of service time for the aircraft occurs.

As such, the foregoing description of the exemplary embodiments of the invention have been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method and system of for identifying aircraft component parts and a method for improved aircraft maintenance as compared to known maintenance methods.

While the invention has been described in terms of various specific embodiments, those skilled in the art will recognize that the invention can be practiced with modification within the spirit and scope of the claims.

What is claimed is:

1. An aircraft component identification and maintenance tracking system comprising:
   a plurality of aircraft components;
   a plurality of radio frequency identification (RFID) tags, wherein each of said RFID tags is associated with a respective one of said aircraft components, said RFID tags comprising identification and maintenance data information specific to said aircraft component to which it is associated, the maintenance data including actions taken and conditions noted relative to the associated aircraft component throughout its life cycle; and
   a transceiver operatively configured to transmit an activation signal to each of said RFID tags, and further configured to receive information transmitted by each of said RFID tags, each said RFID tag configured to transmit at least one of identification data, configuration data, and maintenance data regarding said aircraft component with which said RFID tag is associated, said transceiver configured to generate data setting forth a configuration for an aircraft and consolidate the maintenance data for all the RFID tagged aircraft components based on data received from a plurality of said RFID tags.

2. The aircraft component identification system according to claim 1 wherein said transceiver comprises at least one of a hand-held unit, a fixed base unit, and a mobile unit.

3. The aircraft component identification system according to claim 1 wherein said RIFD tags comprise a passive read-write chip incorporating a reader talk first protocol.

4. The aircraft component identification system according to claim 1 wherein said RIFD tags comprise at least one of a read only memory, a random access memory, and a non-volatile programmable memory.

5. The aircraft component identification system according to claim 1 wherein said transceiver is configured to encode one or more of said RFID tags with data representative of an updated maintenance history for said aircraft component with which said RFID tag is associated.

6. The aircraft component identification system according to claim 1 wherein said RFID tags comprise data related to a plurality of a manufacturer of said aircraft component, a serial number of said aircraft component, a part (or model) number of said aircraft component, a manufacture date of said aircraft component, an installation date of said aircraft component, a revision level of said aircraft component, maintenance activities related to said aircraft component, a block number of said aircraft component, serviceability information, and un-serviceability information for said aircraft component to which a respective said RFID tag is associated.

7. The aircraft component identification system according to claim 6 wherein the serviceability information comprises at least one of an 8130 serviceability record, life limit hours, inspection limit hours, a previous maintenance record, a time since overhaul, an installation date, required maintenance data, a time before overhaul, data relating to special modifications, data relating to air-worthiness directives, data relating to service bulletin compliance, and a no fault found history.

8. The aircraft component identification system according to claim 6 wherein the un-serviceability information comprises at least one of a data and time said aircraft component was removed, operation conditions at time of removal, AHM data noted at time of removal, and an un-serviceable signal.

9. The aircraft component identification system according to claim 1 wherein said transceiver is configured to generate data setting forth consolidated maintenance data for said plurality of aircraft components based on data received from said RFID tags associated with said plurality of aircraft components.

10. The aircraft component identification system according to claim 1 wherein said transceiver is configured to generate data setting forth which of said aircraft components are due for at least one of periodic inspection and periodic replacement based on data received from the plurality of said RFID tags.

11. The aircraft component identification system according to claim 1 wherein a first portion of said RFID tags comprises at least one working address therein that is utilized for accessing said RFID tags for reading of data stored therein and writing of data to be stored therein.

12. The aircraft component identification system according to claim 11 wherein said at least one working address comprises at least one of:
   an aircraft serial number to which said aircraft component is attached or a pseudo-code assigned for inventory and status tracking;
   an International Civil Aviation Organization (ICAO) assigned function code that defines a component type, a superior component type and a sequence number for said aircraft component; and
   a customer key field which configures said RFID tag to respond to an authorized query from said transceiver.

13. The aircraft component identification system according to claim 1 wherein at least one of said RFID tags comprises a processor and non-volatile storage sufficient to store codes and information used to respond to inquiries and requests.

14. The aircraft component identification system according to claim 13 wherein said non-volatile storage comprises embedded software therein enabling said RFID tag to recognize and respond only to authorized inquiry and update requests.

15. The aircraft component identification system according to claim 14 wherein said embedded software enables said RFID tag to only respond to received messages that include a specific authorization code.

16. The aircraft component identification system according to claim 15 wherein the authorization code is user selectable utilizing said transceiver.

17. The aircraft component identification system according to claim 14 wherein said embedded software enables said RFID tag to only respond to received messages that are in a specific data format.

18. The aircraft component identification system according to claim 17 wherein the data format includes one or more defined data fields.

19. The aircraft component identification system according to claim 18 wherein one or more of the defined data fields are read-only fields.

20. The aircraft component identification system according to claim 18 wherein one or more of the defined data fields comprise command codes that specify what type of message is being received by said RFID tag.

21. The aircraft component identification system according to claim 13 wherein said non-volatile storage comprises embedded software therein enabling said RFID tag to format and process information for storage and retrieval.

22. The aircraft component identification system according to claim 1 wherein at least one of said RFID tags is configured to be associated with an aircraft to which it is attached.

23. The aircraft component identification system according to claim 22 wherein said RFID tags configured to be associated with an aircraft comprise data relating to a manufacturer name, a model number, a serial number, and a date of manufacture for the aircraft to which said RFID tags are attached.

24. The aircraft component identification system according to claim 1 wherein at least a portion of said RFID tags comprise a URL pointer stored therein, said URL pointer pointing to a database process that contains a maintenance history for the component to which said RFID tag is attached.

25. The aircraft component identification system according to claim 1 wherein at least a portion of said RFID tags comprise a unique network addressable media access control address.

26. The aircraft component identification system according to claim 1 wherein said transceiver is configured to create authorized query and update requests to satisfy authorization codes embedded within one or more of said RFID tags.

27. A method for maintaining aircraft in which a plurality of aircraft components are integrated with radio frequency identification (RFID) tags, said method comprising:
    transmitting an activation signal for reception by the RFID tags;
    receiving information transmitted by the RFID tags, the information maintenance data including actions taken and conditions noted relative to the associated aircraft component throughout its life cycle;
    generating data setting forth a configuration for the aircraft based on the recieved information; and
    consolidating, from the received information, identification and maintenance data associated with the aircraft components with which the RFID tags are integrated.

28. The method for maintaining aircraft according to claim 27 further comprising:
    performing maintenance on the aircraft component with which the RFID tag is integrated; and
    encoding the RFID tag with information detailing the maintenance performed on the aircraft component.

29. The method for maintaining aircraft according to claim 27 wherein transmitting an activation signal for reception by one of the RFID tags comprises by transmitting a signal from a transponder.

30. The method for maintaining aircraft according to claim 27 wherein determining identification and maintenance data comprises receiving at least a part number and a serial number for the aircraft component with which the RFID tag is integrated.

31. The method for maintaining aircraft according to claim 27 wherein determining identification and maintenance data comprises receiving data representative of a maintenance history for the aircraft component with which the RFID tag is integrated.

32. The method for maintaining aircraft according to claim 31 wherein receiving data representative of a maintenance history for the aircraft component with which the RFID tag is integrated comprises receiving at least one of a manufacture date of the aircraft component, a revision level of the aircraft component, maintenance activities related to the aircraft component, a block number of the aircraft component, serviceability information, and un-serviceability information for the aircraft component.

33. The method for maintaining aircraft according to claim 31 wherein the serviceability information comprises at least one of an 8130 serviceability record, a previous maintenance record, a time since overhaul, an installation date, required maintenance data, a time before overhaul, data relating to special modifications, data relating to air-worthiness directives, data relating to service bulletin compliance, and a no fault found history.

34. The method for maintaining aircraft according to claim 31 wherein the un-serviceability information comprises at least one of a data and time the aircraft component was removed, operation conditions at time of removal, AHM data noted at time of removal, and an un-serviceable signal.

35. The method according to claim 27 wherein transmitting an activation signal for reception comprises transmitting a message that includes an authorization code, the RFID tag configured to only respond to received messages that include the authorization code.

36. The method according to claim 35 wherein transmitting a message that includes an authorization code comprises transmitting a message where the authorization code is user selectable.

37. The method according to claim 27 wherein transmitting an activation signal for reception comprises transmitting a message in a specific data format, the RFID tag configured to only respond to received messages in the specific data format.

38. The method according to claim 37 wherein the specific data format includes one or more defined data fields, a portion of which comprising command codes that specify a message type.

* * * * *